United States Patent Office 3,491,760
Patented Jan. 27, 1970

3,491,760
WOUND COVERINGS
Bernhard Braun, Melsungen, and Heinrich Thiele, Kiel, Germany, assignors to B. Braun International G.m.b.H., Liestal, Switzerland, a Swiss corporation
No Drawing. Filed July 6, 1966, Ser. No. 563,086
Claims priority, application Germany, July 9, 1965, B 82,762
Int. Cl. A61b *17/04;* B32b *9/04;* C09j *3/00*
U.S. Cl. 128—334                                       6 Claims

ABSTRACT OF THE DISCLOSURE

A heteroplastic skin, i.e., wound covering comprising a first tanned collagen gel layer containing about 10 to 25 weight percent of a polyol plasticizer and adhered to one surface of the gel layer a second tanned collagen gel layer of substantially the same composition as the first gel layer but having a lower water content than the first gel layer.

---

This invention relates to wound coverings. It more particularly refers to skin substitutes.

It is known to cover skin defects with various types of "skins." These defects may be wounds, burns, abrasions or the like. Three types of such coverings have been used.

In autotransplantation, a patient's own skin is grafted from another, healthy part of the body onto the injured area. This type of transplantation is generally limited to cases where the wound area is small since to graft larger skin areas would pose problems in that part of the body from which the graft was taken.

In homotransplantation, the skin from one or more other humans, is grafted onto the patient's wound. This type of transplant has usually been unsuccessful over a prolonged period, since the transplanted skin flap generally turns necrotic and is rejected by the patient.

In heterotransplantation, the wound is covered with a "skin" of non-human origin. This replacement skin may be from an animal or it may be of synthetic manufacture. Such heteroplastic skins have been made from foamed or film-form material. They have been made of felted nonwoven fabric of many materials. Halogenated olefin polymers, such as polytetrafluoro ethylene, have been used for this purpose. It has often happened in the past that these heteroplastic skins have, similarly to homoplastic skins, become necrotic and been rejected.

Heteroplastic skins, and in fact all skin transplants, must have certain properties in order to be suited to use. These properties are that:

(1) The wound covering must not irritate the tissue of the wound site and must be free of antigens towards human tissues.

(2) The wound covering must be yielding and elastic to ensure that all layers constituting it are in close contact with the surface of the wound and no folds occur under which the sanies could be trapped.

(3) The wound covering must be suitable for fixation by suturing or sticking to the surrounding hale skin tissue.

(4) The wound covering must join up with the newly formed granulation tissue and gradually cause reepithelization of the injured tissue.

(5) The wound covering must lend itself to easy and reliable sterilization, and it must be put on the market ready for use and in a storable state.

(6) The manufacture of the wound covering must be easy and economical.

In an attempt to provide heteroplastic skins it has been attempted to use collagen films alone or collagen films containing polyamide fibers embedded therein. However, these foils were not successful because they were either too dry or dried too quickly so that they contracted and formed folds under which secretions from the wound accumulated which were strongly exposed to infections and finally caused rejection of the graft. Moreover, the tender tissue buds of the granulation tissue hit the hard foil and withered.

Accordingly, it was endeavoured to use collagen gel foils made from animal proteins which by their high water content very closely resemble human tissue, consist of the identical base material and make important chemical ingredients available for the growth of granulation tissue.

German specification 1,138,536 discloses a process for the manufacture of clear, viscous gels from eye lenses, wherein the eye lenses are dissolved in acids or alkaline solutions of urea or its derivatives or solutions of salts such as lithium thiocyanate and to cause separation of the gel counter-ions are diffused into the solution, or the gel is separated by electrophoresis or by a simple variation of the pH value.

When gels are manufactured by the process of German specification 1,138,536 from proteins, such as collagen, these gels have in their use as wound coverings the disadvantage that they are not sufficiently elastic, that they dissolve at the body temperature and that they are extremely brittle so that they cannot make perfect contact with the surface of the wound site without wrinkling which produces sanies accumulations which in view of the constant risk of infections sooner or later cause rejection by the body.

Thus, it is apparent that none of the heteroplastic or homoplastic skins previously used, satisfied the above-recited requirements.

It is an object of this invention to provide a novel heteroplastic skin.

It is another object of this invention to provide a process for the production of novel heteroplastic foils.

It is a further object of this invention to provide novel heteroplastic skins suitable for grafting onto human tissues.

Other and additional objects of this invention will become apparent from a consideration of this entire specification including the claims appended hereto.

In accord with and fulfilling these objects, this invention includes, as one of its aspects, the provision of a heteroplastic skin which promotes the formation of granulation tissue by the surface of the wound being covered. This heteroplastic skin is produced by forming it in a suitable nutrient medium so that the skin contains at least some of the tissue building elements of the medium in appropriate molecular size such that these building elements are available to the wound.

The heteroplastic skin according to this invention is prepared by gelling a sol of animal collagen. The collagen sol is prepared in a known manner, foamed, converted to the gel state in the known manner in foam form, tanned and a collagen covering film is adhered to the tanned gel. It is suitable in the practice of this invention to provide at least about 10 weight percent of a plasticizer in the collagen sol which will be incorporated in the collagen foam gel. About 10 to 25 weight percent of plasticizer have been found to be effective with about 20 weight percent being preferred. The plasticizer is suitably a polyol, preferably glycerin. Tanning is suitably accomplished by use of synthetic or vegetable materials as tannins. Physiologically acceptable polyaldehydes such as glutaric dialdehyde and starch polyaldehyde have been found to be quite effective for this purpose.

Improved pliability is achieved by the present invention by imparting a foamy consistency to the gel by injecting air or an inert gas in the form of extremely fine bubbles into the sol before it undergoes molecular orientation and cross-linking. The foam obtained in this manner is substantially lighter, softer and more pliable than a non-foam film form gel and it has the further advantage that sanies can penetrate the vacuoles, and the granulation tissue is offered the most favorable merging conditions as it is newly formed.

Any possibility of external infection and the embrittling of this foam after its application to the wound are prevented by covering it according to this invention with a film cover film which likewise contains collagen, but has a considerably lesser water content and to which, if desired, a bactericidal or bacteriostatic agent that does not damage the tissue may be added. The cover film may be any known firm film containing collagen. Preferably, however, it is manufactured in the same way as the heteroplastic gel of this invention and then dried by allowing a gel 0.03 to 2 cm. thick to dry on a porous sinter plate for a few days and then giving it a short treatment with a dehydrating organic solvent. The resulting tough, elastic, almost leathery film having a high content of glycerin and a low content of water is adhered to the collagen gel foil, for example, with the aid of one of the modern tissue adhesives such as those based on cyanuracrylate compounds. This cover film retards the evaporation of water from the gel and at the same time the firmness of the composite is improved.

The drying out of the gel of this invention may be further counteracted by adhering a plastic film over the cover foil. Moreover, a peripherally protruding plastic film serves for attaching the whole cover to the healthy tissue around the wound by means of a suitable acrylic adhesive. Starting from the edge of the wound, new granulation tissue can then penetrate the collagen foil.

Since in its histological composition skin consists not only of collagenic fibre tissue but is interspersed with elastic fibres, its elasticity is superior to that of a pure collagen foam film. These elastic fibers, like the elastic tape in a textile fabric, constitute the decisive elastic moment.

According to another embodiment of this invention, superior elasticity can be imparted to the collagen heteroplastic skin described above.

This elasticity can be achieved by providing a certain percentage of elastin in the sol from which the collagen gel is produced. Elastin is provided in proportion of up to 20% in the collagen sol and the resulting mixture is then worked up as described above.

Elastin can be obtained from pure elastic fibre tissue as it occurs in animal tissue, for example, in cattle in the neckband and in the sclera of the eye and other similar sources. The collagen/elastin foam films obtained according to this invention which have been plasticized, hardened, tanned and covered with a cover film of reduced water content to retard evaporation, approach human skin very closely.

The pure collagen described above may, if desired, be replaced by gelatin from which foams are made, treated with a plasticizer and tanned, and the resulting gel film is topped with an adhered cover film.

When such a multi-ply film is applied to wound sites on animals or humans and adhered thereto, the following behaviour is observed in histological specimens:

The collagen gel layer adheres firmly to the wound site. No infectious irritation of the wound site is observed. After about 10 days, when the collagen gel layer applied has been transformed into a certain sol state, the new granulation tissue begins to merge, starting from the surface and the edges of the wound, and the wound covering acts as a guide for the desired reepithelization of the wound surface. In the course of the ensuing few weeks this process continues, the epithelial tissue is dispersed inside the whole collagen gel layer until it reaches the harder cover foil. Without traumatizing the granulation tissue, this cover foil can then be pulled off so that the formation of the epithel layer of the wound surface can continue to its completion under the sterile protective cover. Most probably, the collagen gel, which has been caused to undergo lysis, in conjunction with a fermentative scission by the collagenases has supplied to the granulation tissue the necessary structural elements in the form of the aminoacids.

The products manufactured in the manner described are easy to sterilize with the means of modern gas and gamma ray treatment so that sterile heteroplastic skins ready for use can be made in any desired size and can be stored for considerable lengths of time, up to years.

The multi-ply gel films of this invention satisfy the surgeons' demand for suitable wound coverings for treating extensive skin defects and they open up new routes for the treatment of serious abrasions and burns.

In performing the present process the collagen sols and, alternatively also the elastin sols, are manufactured in a first stage. The starting material used is animal skin, preferably the skin of pigs or calves. Of the three layers of the skin only the corium is used. The corium is cut up in pieces and swelled, for example with dilute lithium hydroxide solution, to extract the fat from it. The residue is then swelled further until the pieces of skin can be squashed in a simple homogenizing machine. The resulting sol must have a transparent, glassy appearance.

The transformation of the proteins into the sol state can be achieved, for example, by an enzymatic treatment.

Since during the preparation of the collagen sols the mucopolysaccharides are completely destroyed, they must be supplied again to the sol before its conversion into the gel. Starting materials suitable for the manufacture of mucopolysaccharides are, for example, hyaluronic acid sols, umbelical cords, glass bodies from cattle, pigs and sheep, or foetal skins, and for chondroitinsulphate sols the cornea and sclera, the neckband and aorta from cattle, and cartilaginous parts from old or young animals, above all the windpipe.

The starting material is distintegrated and rinsed in water, extracted for 2 to 3 days at a temperature of 0° C. or little higher with saturated potassium chloride solution and then dialyzed against distilled water. The extracts are rendered slightly alkaline (pH=7 to 8) and concentrated at a maximum temperature of 20° C. The sols are stored in the cold until they are used.

The mucopolysaccharide sol is then added to the collagen sol, and into this sol mixture air or an inert gas is injected. To renature the dissolved collagen an electrolyte is advantageously diffused through the batch. The electrolyte used must be divalent and capable of forming complexes. The ion diffusion is performed in 5 stages: In the first stage there is formed at the interface between sol and electrolyte a primary diaphragm which has such fine pores that it may be looked upon as being impermeable to bacteria. The primary diaphragm consists of oriented linear macromolecules. In the second stage separation into droplets occurs. After the ions have diffused through the primary diaphragm they are partially discharged and thereby give off hydrate water. In the third stage microscopically small water droplets are pushed by the nascent gel through the sol and thereby form narrow, parallel channels, that is to say a capillary zone. This phenomenon can be controlled and depends on the concentration and temperature of the sol and/or the electrolyte. In the fourth stage the stream of the diffusing ions is retarded by the increasing layer thickness of the gel, and the water droplets are given sufficient time to coalesce into larger units (lens formations). In the fifth stage these lenses likewise coalesce to form heavier layers or stripes.

The finished gel is then sliced to form films of suitable thickness and the excess electrolyte solution is eluted from them. The gel foils are then tanned until the desired resorption stability has been reached.

The cover film may be prepared in an identical manner and then dried.

The dried cover film adhered to one surface of the gel film with the use of a suitable adhesive.

If desired, this two-ply material may be topped off with a plastic material capable of being cemented, such as a polyvinylchloride foil.

The following example serves to illustrate the practice of this invention without in any way being limiting on the scope thereof.

EXAMPLE (A) Manufacturing the collagen sol

Pig skin corium is cut up into small pieces and swelled with 0.2 N-lithium hydroxide solution with the aid of a vibrator operating at the frequency of 60 c.p.s. alternating current. After having changed the alkali solution several times the corium is substantially free of fat. It is then further swelled with 1 N-lithium hydroxide solution until the pieces of skin can be squashed in a simple homogenizing machine. The resulting sol has a transparent, glassy appearance. The lithium hydroxide is then removed by dialysis.

(B) Manufacturing the gel foil

Approximately 300 g. of a collagen sol manufactured as described above under (A), having a solids content of about 1.5% (=4.5 g. of protein) and about 180 g. of a collagen sol prepared in a corresponding manner from calf skin, having a solids content of about 2.5% (=4.5 g. of protein) are mixed with 56 g. of a chondroitin sulphate sol having a solids content of about 0.8% (=0.45 g. of crude chondroitin sulphate) and while being vigorously stirred mixed with 45 g. of glycerin and sufficient distilled water to establish a solids content of about 1.2%, which requires about 180 g. of distilled water. This mixed sol is poured into a glass cylinder whose bottom is formed by a glass sinter layer, through which compressed air is injected. The foamed batch is then converted into a gel with a 1 N-cadmium nitrate solution. The layers are sliced to a thickness of 5 to 6 mm., and the excess electrolyte solution is eluted. Finally, the foamed gel is tanned with a glutaraldehyde solution of 4% strength.

To render the transplants even firmer they are immersed in acetone, and then repeatedly rinsed with distilled water. One side of the transplants is dried off and a correspondingly dimensioned cover film is adhered thereto with a suitable adhesive.

(C) Manufacturing the cover film 300 grams of a collagen sol manufactured as described above under (A), having a solids content of about 1.5% (=4.5 g. of protein) and 300 g. of an elastin sol from the cattle sclera, having a solids content of about 1% (=3.5 g. of protein), in admixture with 75 g. of a sodium alginate sol of 2% strength and 45 g. of glycerin, are mixed, while being continuously stirred, with sufficient distilled water to establish a solids content of about 1%. This batch is transferred to a flat dish and superficially sprayed with a 1 N-cadmium nitrate solution. After about 24 hours the gel forms a layer about 2 to 3 cm. thick. The gel is then sliced on a suitable machine into discs about 3 mm. thick which are repeatedly rinsed with distilled water to remove any excess cadmium nitrate solution. The last rinsing water is mixed with 10 to 20% of glycerin to ensure pliability of the film. The films are then cut to size and dried at room temperature on an absorbent, fibre-free support.

The finished cover film contains 20% of glycerin and 35% of water and has a dry content of about 45%.

What is claimed is:

1. A heteroplastic skin comprising a first tanned collagen gel layer containing about 10 to 25 weight percent of a polyol plasticizer and adhered to one surface of said gel a second tanned collagen gel layer of substantially the same composition as said first gel layer but having a lower water content than said first gel.

2. A skin as claimed in claim 1 having a thermoplastic polymer film adhered to said second gel layer.

3. A skin as claimed in claim 1, wherein said plasticizer is glycerin.

4. A skin as claimed in claim 1, wherein said gel is in foam form.

5. A skin as claimed in claim 4, wherein said gel contains elastin.

6. A skin as claimed in claim 1, wherein said gel layers are adhered together with a cyanuracrylate adhesive.

References Cited

UNITED STATES PATENTS

| | | | |
|---|---|---|---|
| 2,770,566 | 11/1956 | Ritter | 161—227 X |
| 3,272,204 | 9/1966 | Artandi C. et al. | 128—334 |
| 3,366,440 | 1/1968 | Nuwayser | 128—334 X |
| 2,385,803 | 10/1945 | Cohn | 128—335.5 X |
| 2,475,697 | 7/1949 | Cresswell | 128—335.5 X |
| 3,114,591 | 12/1963 | Nichols et al. | 128—335.5 X |

OTHER REFERENCES

Peacock et al. "Use of Tanned Collagen Sponges in the Treatment of Liver Injuries," Annals of Surgery 161, 238 (1965).

DALTON L. TRULUCK, Primary Examiner

J. D. YASKO, Assistant Examiner

U.S. Cl. X.R.

128—335.5; 156—331; 161—226, 248